(12) United States Patent
Dryer

(10) Patent No.: US 8,638,253 B1
(45) Date of Patent: Jan. 28, 2014

(54) VIBRATING RADAR SENSOR

(75) Inventor: Paul Dryer, Marshfield, MA (US)

(73) Assignee: BBN Technologies Corp., Cambridge, MA (US)

( * ) Notice: Subject to any disclaimer, the term of this patent is extended or adjusted under 35 U.S.C. 154(b) by 699 days.

(21) Appl. No.: 12/945,062

(22) Filed: Nov. 12, 2010

(51) Int. Cl.
*G01S 13/42* (2006.01)
*G01S 13/86* (2006.01)

(52) U.S. Cl.
USPC ............... 342/28; 342/57; 342/61; 342/73; 342/107; 342/109

(58) Field of Classification Search
USPC ............ 342/20, 28, 52, 57, 61, 73, 107–109
See application file for complete search history.

(56) References Cited

U.S. PATENT DOCUMENTS

| | | | |
|---|---|---|---|
| 6,497,656 B1 | 12/2002 | Evans et al. | |
| 7,447,174 B2* | 11/2008 | Joshi | 370/328 |
| 7,570,927 B2* | 8/2009 | Correal et al. | 455/90.1 |
| 7,925,278 B2* | 4/2011 | Bani Hani | 455/456.6 |
| 8,290,437 B2* | 10/2012 | Simons et al. | 455/41.2 |
| 8,340,682 B2* | 12/2012 | Taylor et al. | 455/456.1 |
| 8,355,758 B2* | 1/2013 | Wirola et al. | 455/574 |
| 8,483,703 B2* | 7/2013 | Swope et al. | 455/456.1 |
| 2002/0094825 A1* | 7/2002 | Endo et al. | 455/456 |
| 2005/0228613 A1* | 10/2005 | Fullerton et al. | 702/150 |
| 2005/0275508 A1 | 12/2005 | Orr et al. | |
| 2006/0223547 A1 | 10/2006 | Chin et al. | |
| 2007/0057913 A1 | 3/2007 | Eid et al. | |
| 2008/0007445 A1 | 1/2008 | Leach et al. | |
| 2008/0272907 A1 | 11/2008 | Bonansea et al. | |
| 2009/0243825 A1 | 10/2009 | Schofield | |
| 2010/0188304 A1* | 7/2010 | Clymer et al. | 343/753 |

OTHER PUBLICATIONS

International Search Report dated Aug. 17, 2012, PCT/US2011/57784, pp. 2.

* cited by examiner

*Primary Examiner* — John B Sotomayor
(74) *Attorney, Agent, or Firm* — Chapin IP Law, LLC

(57) ABSTRACT

Embodiments disclosed herein include a radar sensor device for detecting movement and velocity of external objects within or around a particular radar sensor field. The radar sensor field can use an array or cluster or radar sensors, including compact (portable by hand) radar sensors that function as network nodes within a wireless, low-energy ad hoc network. Radar sensor devices can use vibration as a means of communicating power status, functionality, and progress of installation of a particular radar unit. Such a vibration can be executed at a particular predefined cadence, rhythm, or other pattern, to indicate a powered-on state, active network connectivity, and other device states. Such a radar sensor device provides silent and non-visible status indication for quick and efficient deployment.

20 Claims, 6 Drawing Sheets

VIBRATING RADAR SENSOR

BACKGROUND

The present disclosure relates to radar systems and methods. Radar is an object detection system that uses electromagnetic waves to identify range, altitude, direction, and/or speed of both moving and fixed objects such as aircraft, ships, motor vehicles, weather formations, terrain and people. Radar is sometimes referred to as radio detection and ranging. Conventional radar systems have a transmitter that emits radio waves. When transmitted radio waves contact an object the radio waves are scattered in all directions. A portion of the radio waves is thus reflected back towards the radar system. Reflected radio waves have a slight change of wavelength (and thus frequency) if the target is moving. Radar systems also include a receiver. The receiver is typically located in a same location as the transmitter. Although the reflected signal is usually very weak, the reflected signal can be amplified through use of electronic techniques in the receiver and in the antenna configuration. Such amplification enables a radar unit to detect objects at ranges where other emissions from a target object, such as sound or visible light, would be too weak to detect. Radar uses include meteorological detection of precipitation, measuring ocean surface waves, air traffic control, police detection of speeding traffic, and military applications.

SUMMARY

Conventional radar systems for use in force protection applications, surveillance applications, and other applications, have been large, heavy units, primarily intended for permanent installation around a perimeter to be protected or mounted on specialized equipment, making them impractical for use in a tactical deployment.

Radar systems developed in association with this disclosure, however, include a radar sensor system that includes relatively compact radar sensor units. Such a compact radar system can include one or more portable radar devices that can be positioned and repositioned at various locations. Individual radar devices can be sized relatively smaller than conventional radar units. For example, a given compact radar device can be sized similar to the size of a beverage can or bottle. These compact radar devices or sensors can be deployed in groups to form a network of radar nodes. Each radar node can communicate with neighboring radar nodes to communicate collected radar data. An example capability of such a network is detection and tracking of humans in difficult sensing environments. A system of networked compact radar sensors can provide critical advanced warning of intruders in situations where detection time is critical.

Such compact radar sensors can offer superior size and weight characteristics, and exceptional target detection and localization capabilities. Such systems can also employ low-power networking capability for communications, allowing for both remote system control as well as data filtration for remote use by handheld devices.

Compact radar units can be buried in the ground with the antenna placed in a bush or in a tree, or positioned with just an attached antenna visible above the ground surface. Alternatively, the entire radar unit can be placed or mounted on a tree or a side of a hill. Because probable placement locations of radar units might include locations in dangerous areas, an amount of time required for positioning and configuring a radar unit should be minimal.

Techniques disclosed herein provide quick, efficient, and covert initiation and status indication, such that initiation of a radar sensor device, and checking status of a radar sensor device is substantially inaudible and non-visual. Such techniques can include providing vibration and patterns of vibration to indicate functionality of a given radar sensor device.

One challenge with compact radar sensor units relates to circumstances surrounding a typical deployment. Specifically, it is common that such compact radar sensors are covertly installed in a given location. In an example deployment, an operator of a compact radar unit covertly approaches or sneaks up to a given geographical location. In such deployment situations it is important that there are no visual status indicators on the device itself. It is also important that there are no audible status indicators on the device itself. The lack of audio and visual status indicators is important both during deployment (initialization) and during operation. Thus, it is important that such a compact radar sensor lack any type of display screen or lights to indicate proper functionality. It is common for compact electronic devices to have one or more LED lights to indicate that a particular electronic device is powered on, or to indicate proper functionality of the particular electronic device. Lack of audio and visual status indicators during operation can be important because the compact radar sensor can be positioned in a hidden location (such as in outdoor terrain), and having an audible or visual status indicator could make a deployed/hidden radar sensor discoverable to passersby. Such a unit may include an interface for connecting with a separate display device, such as by plugging into the radar unit itself to verify status, but such a display unit adds complexity and would incorporate a lit display screen, which could compromise position during deployment—especially when deployment is executed in dark conditions.

Compact radar sensors and/or radar relay nodes can be deployed as part of a network, such as a wireless ad hoc network. Accordingly, positioning a unit appropriately is important to know whether a given unit has joined the network. For example, an operator can covertly approach a particular geographical location to deploy the radar unit, such as by positioning the unit in or on the ground. The operator, however, in consequence of not having or wanting any visual or audible status indicators connected to the radar node, does not have a way of knowing whether there is communication with the wireless network and communication with a corresponding data center, communication center, or other control location. Moreover, using any type of radio or phone to communicate with a control location to verifying device status and network connection is also not desirable because such audible communication could alert nearby people of the presence of the operator and/or the radar unit, especially since the particular geographic location of deployment can be considered dangerous or critical.

Techniques disclosed herein use vibration as a means of communicating status and functionality of a compact radar unit, and progress of installation of a particular radar unit. In practice, an operator of the radar unit can maneuver into a target geographical location for placement or deployment of the radar unit, such as by sneaking into a particular geographic location. Upon turning on, or powering-on, the unit, the unit can vibrate to indicate that the radar unit is receiving power. Such a vibration can be executed at a particular predefined cadence, rhythm, or other pattern, to indicate a powered-on state. As the radar unit then tries to establish itself as part of a low-energy ad hoc network, such as by using heartbeat messages exchanged within the network as the radar unit or node is being added to the network, the radar unit can indicate a successful network connection by executing a vibration of a particular cadence or pattern. The vibration pattern can indicate status and/or progress of establishing connectivity of the radar unit that is joining the network. In response to successfully establishing a network connection to the radar network, the radar node can then communicate or indicate such a successful connection via a particular vibration pattern or vibration cadence. In situations where the radar unit is unable to establish a network connection, the operator can detect a corresponding vibration, or lack of vibration, to know that the radar unit needs to be repositioned or relocated.

In one embodiment, a radar sensor device includes a processor, a memory coupled to the processor, and power circuitry that is configured to receive a supply of power from at least one battery. The radar sensor device also includes a radar signal transmitter that is configured to transmit radar signals, and a radar signal receiver configured to receive reflected radar signals. The processor is configured to compute radar data from received reflected radar signals. Such computed radar data can include a distance from an external object, and a relative velocity of the external object, among other radar data. The radar sensor unit also includes radio circuitry that is configured to wirelessly transmit radar data to at least one peer radar sensor device that functions as a network node. The radar sensor unit includes a vibration mechanism. The radar sensor unit can execute instructions that cause the radar sensor device to power-on the radar sensor device in response to receiving an input to power-on the radar sensor device. The radar sensor device can indicate that the radar sensor device has been successfully powered-on by causing a first vibration via the vibration mechanism. The radar sensor unit can also indicate status of a wireless network connection to a given radar sensor network by causing a second vibration using the vibration mechanism. The first and second vibration mechanisms can be different, thereby providing distinguishable types of vibration.

In another embodiment, a method includes a status manager for communicating status information of a radar device. The status manager can function as an application or software process. Accordingly, the status manager powers-on a wireless network relay node device in response to receiving an input to power-on the wireless network relay node device. The wireless network relay node device includes networking circuitry configured to wirelessly forward radar data received from at least one first wireless peer node device to at least one second wireless peer node device. The status manager indicates that the wireless network relay node device has been successfully powered-on by causing a first vibration via a vibration mechanism. The wireless network relay node device establishes, or attempts to establish, a wireless network connection with at least one peer wireless node device to join a given network to transmit collected radar data. The status manager then indicates status of the wireless network connection by causing a second vibration via the vibration mechanism. The first vibration can be a first predetermined pattern of vibration, while the second vibration can be a second predetermined pattern of vibration, wherein the second predetermined pattern of vibration is distinct from the first predetermined pattern of vibration.

Yet other embodiments herein include software programs to perform the steps and operations summarized above and disclosed in detail below. One such embodiment comprises a computer program product that has a computer-storage medium (e.g., a non-transitory, tangible, computer-readable media, disparately located or commonly located storage media, computer storage media or medium, etc.) including computer program logic encoded thereon that, when performed in a computerized device having a processor and corresponding memory, programs the processor to perform the operations disclosed herein. Such arrangements are typically provided as software, firmware, microcode, code data (e.g., data structures), etc., arranged or encoded on a computer readable storage medium such as an optical medium (e.g., CD-ROM), floppy disk, hard disk, one or more ROM or RAM or PROM chips, an Application Specific Integrated Circuit (ASIC), a field-programmable gate array (FPGA) and so on. The software or firmware or other such configurations can be installed onto a computerized device to cause the computerized device to perform the techniques explained herein.

Accordingly, one particular embodiment of the present disclosure is directed to a computer program product that includes one or more non-transitory computer storage media having instructions stored thereon for supporting operations such as: powering-on a wireless network relay node device in response to receiving an input to power-on the wireless network relay node device, the wireless network relay node device including networking circuitry that wirelessly forwards radar data received from at least one first wireless peer node device to at least one second wireless peer node device; indicating that the wireless network relay node device has been successfully powered-on by causing a first vibration via a vibration mechanism; establishing a wireless network connection with at least one peer wireless node device to join a given network to transmit collected radar data; and indicating status of the wireless network connection by causing a second vibration via the vibration mechanism. The instructions, and method as described herein, when carried out by a processor of a respective computer device, cause the processor to perform the methods disclosed herein.

Other embodiments of the present disclosure include software programs to perform any of the method embodiment steps and operations summarized above and disclosed in detail below.

Of course, the order of discussion of the different steps as described herein has been presented for clarity sake. In general, these steps can be performed in any suitable order.

Also, it is to be understood that each of the systems, methods, apparatuses, etc. herein can be embodied strictly as a software program, as a hybrid of software and hardware, or as hardware alone such as within a processor, or within an operating system or within a software application, or via a non-software application such a person performing all or part of the operations. Example embodiments as described herein may be implemented in products and/or software applications such as those manufactured by BBN Technologies, Cambridge, Mass.

As discussed above, techniques herein are well suited for use in software applications supporting radar deployment applications. It should be noted, however, that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

Techniques disclosed herein use vibration as a means of communicating status and functionality of a compact radar unit, and progress of installation of a particular radar unit with a given network. In practice, an operator of the radar unit can maneuver into a target geographical location for placement or deployment of the radar unit, such as by quietly approaching or sneaking into a particular geographic location. Upon turning on, or powering-on, the unit, the unit can vibrate to indicate that the radar unit is receiving power. Such a vibration can be executed at a particular predefined cadence, rhythm, or other pattern, to indicate a powered-on state. The cadence or pattern can be flexible or programmable. As the radar unit then tries to establish itself as part of a low-energy ad hoc network, such as by using heartbeat messages exchanged within the network as the radar unit or node is being added to the network, the radar unit can indicate a successful network connection by executing a vibration of a particular cadence or pattern. The vibration pattern can indicate status and/or progress of establishing connectivity to the radar unit that is joining the network. In response to successfully establishing a network connection to the radar network, the radar node can then communicate or indicate such a successful connection via a particular vibration pattern or vibration cadence. In situations where the radar unit is unable to establish a network connection, the operator can detect a corresponding vibration, or lack of vibration, to know that the radar unit needs to be repositioned or relocated.

Such techniques are useful, as described above, due to covert or silent deployment requirements associated with corresponding radar sensor networks. Such techniques provide a mechanism or process of speeding node installation to keep the installation and/or status check as secret as possible by giving some feedback that indicates whether a particular device is positioned properly and functioning properly.

Figure 1:
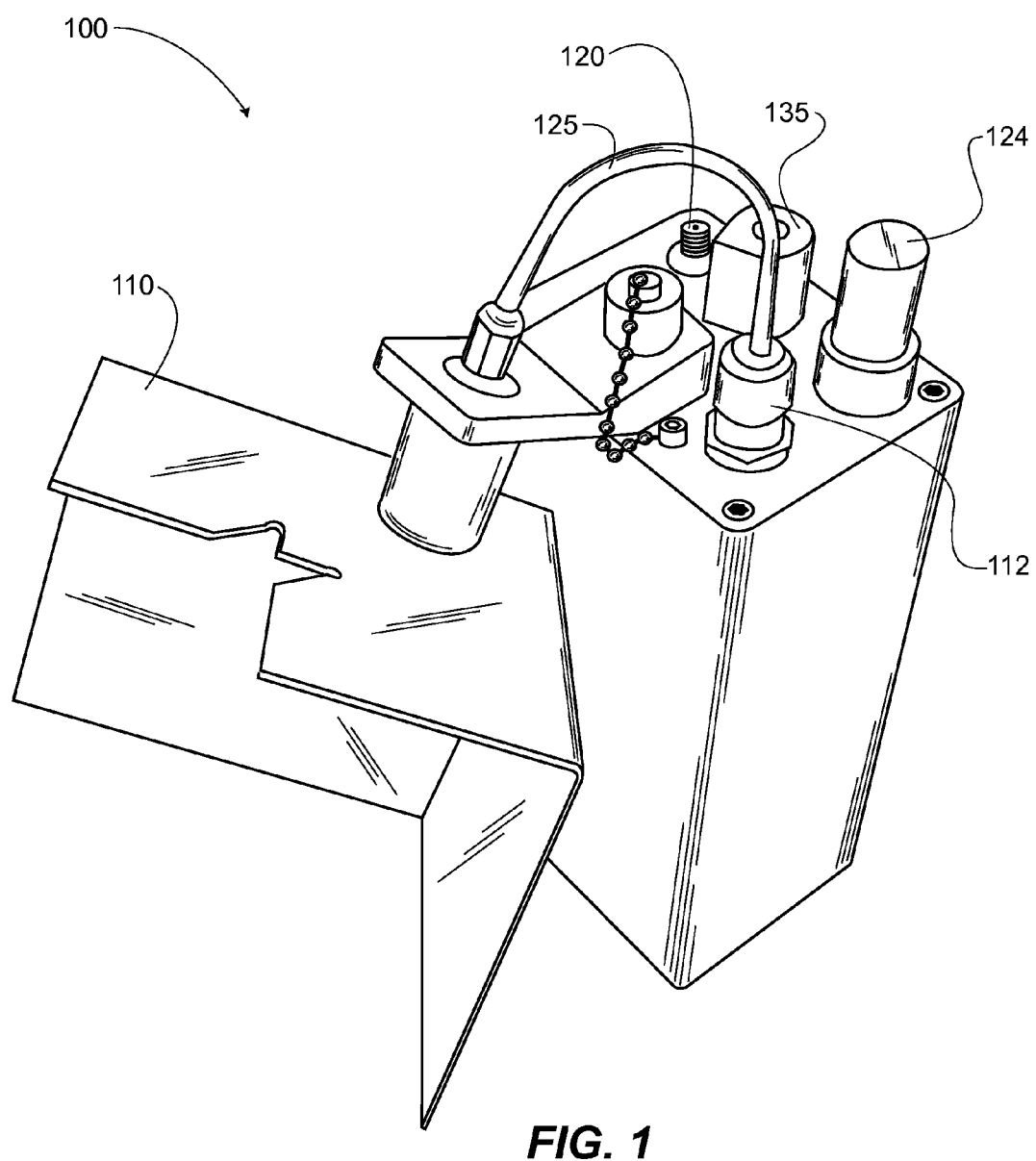
FIG. 1 is an illustration of an example radar sensor device according to embodiments herein.
Figure 3:
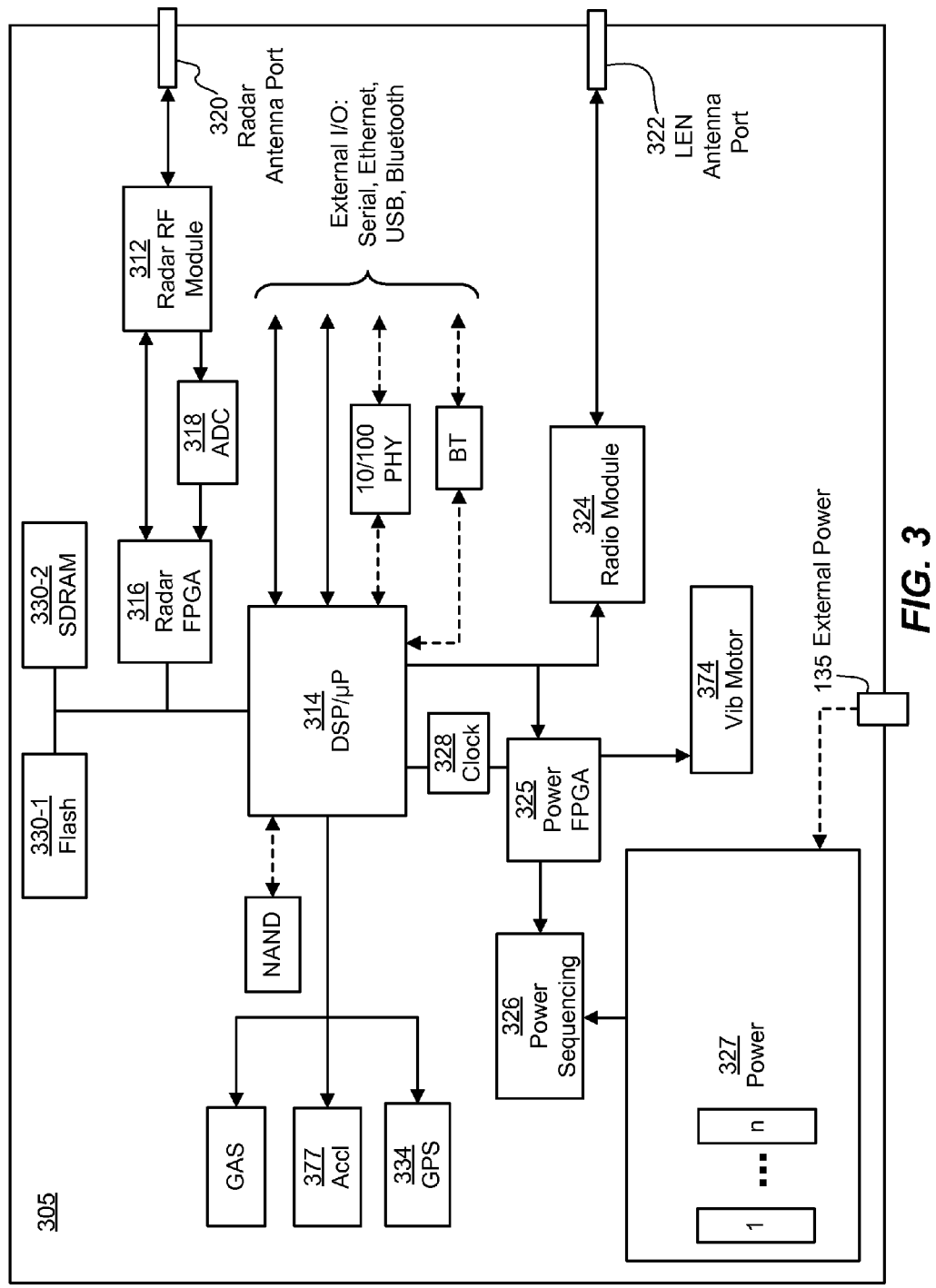
FIG. 3 is a block diagram of example system architecture for a low energy ad hoc radar sensor device according to embodiments herein.

Referring now to FIG. 1 in conjunction with FIG. 3, FIG. 1 depicts an example radar device 100 having different types of transmission functionality (radar, radio, GPS). Radar device 100 can receive and transmit radar signals using radar antenna 110 and radar antenna port 112. The example illustration shows radar antenna 110 mounted to radar device 100. In alternative embodiments, the radar antenna 110 can be positioned away from radar device 100, such as being positioned in a tree while being connected to radar device 100 via radar antenna port 112. Radar device 100 can also receive and transmit radio communications via radio antenna port 120. Radio antenna port 120 can be used to receive wireless signals on a short-range radio frequency band, such as from a relatively proximate location. Radar antenna 110 can double as a radio antenna. Alternatively, a separate radio antenna can be used with radio port 120. Both the radar and radio antennas can be attached to the device 100 remotely via a cable. GPS antenna 124 can be used to provide location information. Power switch 135 can be used to power-on or power-off radar device 100.

Figure 2:
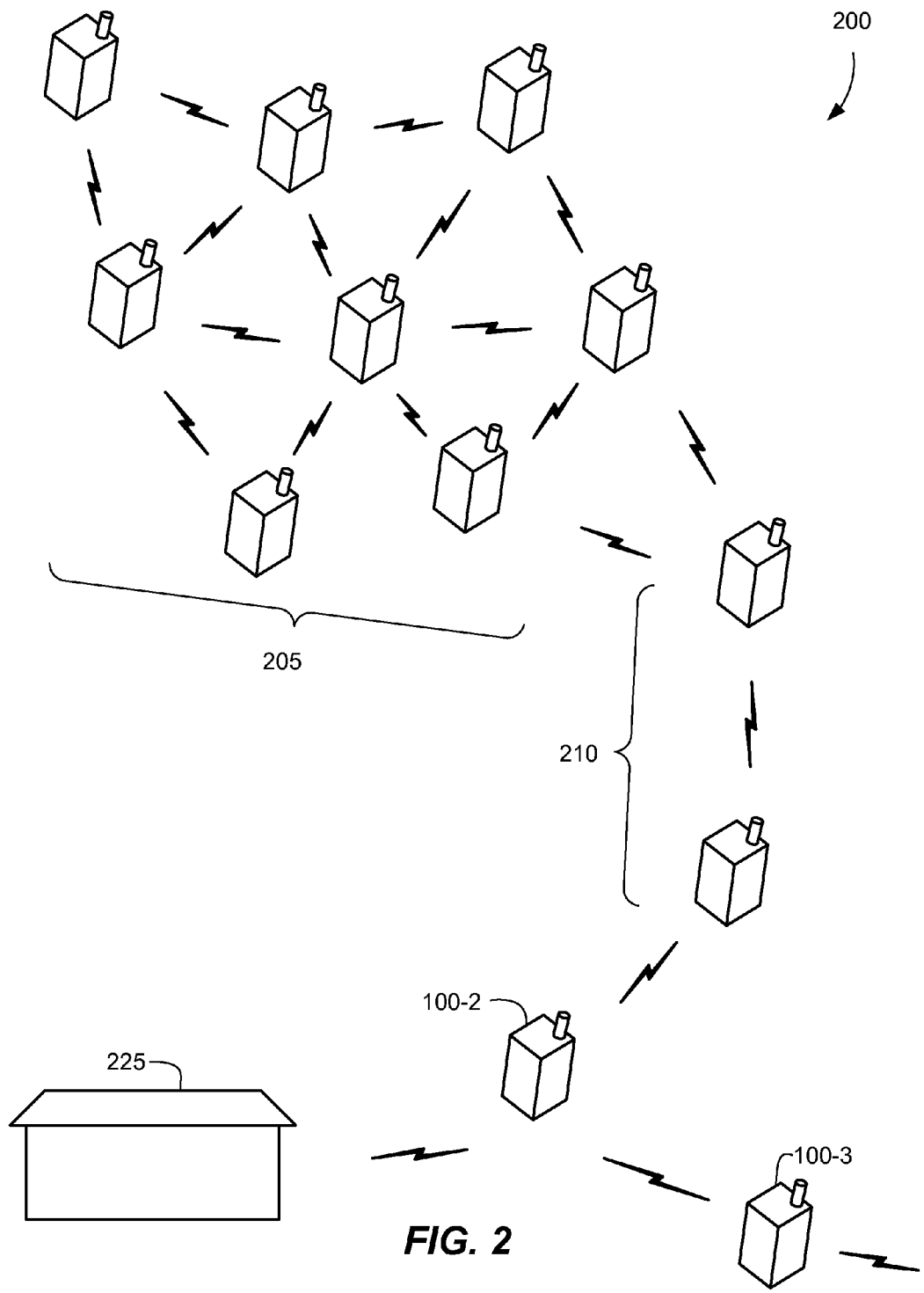
FIG. 2 is an illustration of an example radar sensor field array and network according to embodiments herein.

FIG. 2 depicts an example radar sensor field and network in which radar device 100 can be deployed and operate. Radar devices in cluster 205 can include a plurality of radar devices 100 forming a radar sensor field. For example, the radar devices 100 can be deployed within a particular geographical area of interest. Note that FIG. 2 is merely an exemplary arrangement of a radar sensor network. Other embodiments can include a radar sensor network of just a few radar devices, to a network of hundreds or thousands of radar devices. Radar devices in group 210 function as relay nodes for relaying radar data to and from radar sensor field cluster 205. Radar relay devices within group 210 can optionally include radar sensor functionality, or can function primarily as wireless network nodes. Radar device 100-2 can function as a gateway device or router between control center 225 and one or more additional radar networks or sub-networks, which additional networks can be accessible via radar node device 100-3. Note that relay and gateway nodes can be embodied with a different hardware configuration than radar nodes. Radar nodes can function as relay nodes. Some embodiments can include devices that are specifically configured as either relay or gateway nodes to save cost, weight, etc. All of the sensor, relay, and gateway nodes can provide vibration support for feedback.

FIG. 3 depicts a block diagram 305 of a radar device 100, which can be embodied as a low-energy ad hoc network node, radar sensor unit, or relay node that performs status indication according to embodiments as disclosed herein. The radar device 100 includes power circuitry 326, which is used to provide, sequence, and control power to various other components of the system in combination with Power FPGA 325. The power circuitry 326 can be armed and disarmed with respect to a position of an external power switch 135. A power source 327 can include one or more batteries. Radar device 100 also includes radio module 324 having a port 322 for a wireless communication antenna (e.g., a Low Energy Network (LEN) antenna). Radio module 324 and antenna are used to provide wireless network communication with other wireless systems.

A Radar RF module 312 is also shown having a port 320 for radar antenna 110. Also shown is a Global Positioning System (GPS) module 334, which is used to provide location information regarding the device 100. Device 100 further includes clock distribution circuitry 328 for distributing and synchronizing various clocks across the device 100. An Analog to Digital Converter (ADC) 318 is included and a wakeup timer circuit is used for controlling various components according to when respective components should be active, such as in power management.

Radar device 100 also includes memory circuitry 330, which is used for storing various state and acquired information (e.g. radar events, audio data, video data, GPS position data (or the like)) for later retrieval and/or transmission. In this example, memory is shown as 330-1 Flash and 330-2 SDRAM. Also shown is Field Programmable Gate Array (FPGA) 316 and Digital Signal Processor (DSP) 314. A vibrator or vibrator motor 374 can be coupled to radar device 100, along with accelerometer 377. Vibrator 374 can be any conventional vibration motor or vibration technique. Device 100 can also include circuitry and interfaces for external inputs and outputs, such as serial connections, Ethernet, USB, Bluetooth, etc.

The memory 330 can include instructions for the processor (such as digital signal processor 314) to execute a status manager process and application.

Operational software in the nodes(s) is executed on the DSP 31, which also functions as the microcontroller in the system. Radar processing, initiation of power management, radio, GPS, vibrator control, etc. can all be run by software executed by the DSP 314. Note that an actual configuration for carrying out the status manager can vary depending on a respective application. For example, radar device 100 can include one or multiple computers or computer processors that carry out the processing as described herein. In alternative embodiments, radar device 100 can be any of various types of networking devices. A communications interface enables the status manager of radar device 100 to communicate over a network and, if necessary, retrieve any data required to indicate status according to embodiments herein. The memory system can be encoded with the status manager that supports functionality as described above and as described further below. The status manager (and/or other resources as described herein) can be embodied as software code such as data and/or logic instructions that support processing functionality according to different embodiments described herein.

During operation of one embodiment, a processor accesses the memory system via the use of a wired or wireless interconnect to launch, run, execute, interpret or otherwise perform the logic instructions of the status manager. Execution of the status manager produces processing functionality. In other words, the status manager process represents one or more portions of the status manager performing within or upon the processor in the radar device 100.

It should be noted that, in addition to the status manager process that carries out method operations as discussed herein, other embodiments herein include the status manager itself (i.e., the un-executed or non-performing logic instructions and/or data). The status manager may be stored on a non-transitory, tangible computer-readable storage medium including computer readable storage media such as floppy disk, hard disk, optical medium, etc. According to other embodiments, the status manager can also be stored in a memory type system such as in firmware, read only memory (ROM), or, as in this example, as executable code within the memory system. In addition to these embodiments, it should also be noted that other embodiments herein include the execution of the status manager in the processor as the status manager process. Thus, those skilled in the art will understand that the radar device 100 can include other processes and/or software and hardware components, such as an operating system that controls allocation and use of hardware resources, or multiple processors.

Now more particularly, for a given use of radar device 100, an operator approaches a selected installation location and powers-on the radar unit holding the radar unit by hand within the vicinity of the installation location. Note that the radar unit does not first need to be positioned within a tree or bush or ground prior to powering on the unit and connecting to the network. In other words, a given operator can hold the radar unit in his or her hand until receiving a vibration indicating that the radar unit is powered-on and/or connected to a given radar network, as indicated by a particular vibration pattern or cadence. Typically, such a wireless radar node will either be visible to the radar network, or not visible in that relatively small movement or orientation changes of the wireless radar unit are generally not determinative of a network connection. Instead, network connectivity with such compact radar nodes is more dependent upon line-of-sight, height, terrain characteristics, and distance/range from other nodes. For example, there may be a hill in the way of a peer node, or the particular terrain might be too rugged for radio frequency communication. Characteristics of a particular terrain can have a significant impact on range of a given radar node. Certain frequencies of RF are line-of-sight dependent for proper communication.

For example, certain device embodiments can have an associated range within which a given radar field or sensor field is deployed. The given sensor field may be deployed miles from a communication station or communication base. In other words, a manned network station might be dozens of miles from the sensor field. In certain embodiments, a given sensor device or radar node might have a range of about half a mile to 1 mile, before needing another sensor node, relay node, or gateway node to maintain network connectivity.

The status manager can indicate any number of statuses using any number of vibration pulses or vibration patterns. One status for indication is that of on/off (power status). Another status can indicate a progression of a boot sequence. Another status indicator can indicate whether a particular radar node has adequate or sufficient communication to one or more peer relay nodes, whether the radar unit was able to join the network, and whether the radar unit is currently part of the network. Another status indication is power status after deployment or initialization. For example, such a wireless radar node can be powered via a battery supply that needs to be periodically replaced. Since one embodiment of the radar unit is a compact radar node that is portable, such units use one or more batteries for power. Conventional radar systems are relatively large, not easily portable, and require more power than what conventional batteries supply. As a result of using a battery power supply, at some point an operator will need to return to a geographical placement location, such as by sneaking out to that location, and then swapping batteries. This may involve powering off the unit, swapping batteries, and then powering-on the unit. In response to swapping batteries, the radar unit can then communicate power status and network status via vibration so that the operator can leave that particular device to go check on another radar unit.

Embodiments herein can communicate status at any point after installation. For example, a given operator returns to a node placement location to check or verify that the particular node is still receiving power and connected to the network. Such a communication or indication of status can be communicated via vibration in response to receiving a corresponding request. For example, the corresponding request can be received such as by manual selection or movement of a button or knob that is part of the radar unit. Alternatively, the radar unit can include accelerometer such that, upon detecting certain acceleration, the status manager indicates status, power, etc., via a particular vibration pattern. By way of a non-limiting example, an operator can shake the radar device, which causes the radar device to respond with one or more vibrations to indicate that the unite is receiving power, connected to the network, out of the network, has a low power supply, and so forth.

In one embodiment, a vibration motor can be attached to an exterior housing of the radar node device. For example, vibrator 374 can be mounted against the interior of a sidewall so that vibration can be easily detected by fingers when the radar node device is held in a typical grip. The vibration motor can be included in radar sensor nodes, relay nodes, gateway nodes, network routers, and so forth.

Other embodiments can include additional types of sensor devices or nodes that provide vibration feedback as members of a low-energy ad hoc network. For example, other sensor nodes can include devices with cameras, microphones, gauges, etc., that monitor or capture seismic data, video data, audio data, infrared data, and so forth. Such additional types of sensors, like radar sensor nodes, may need to be covertly placed, and, as such, can include a vibration mechanism that provides feedback to an operator. For example, in addition to the radar sensors depicted in cluster 205 of FIG. 2, cluster 205 can include additional types of sensor devices (not shown) having vibration feedback functionality. Such vibration functionally can be integral with each respective type of sensor device, or coupled to such devices. Third party devices can be coupled to a networking module enabling access to the low-energy network. Such an adaptation module can also include vibration support. Alternatively, additional types of sensor mechanisms can be coupled to, or a part of, the radar node devices themselves. For example, the radar node device can include a seismic sensor, which can provide feedback to the node device, or feedback in combination with the vibrator motor and/or accelerometer. In other words, the low-energy network can function with independent sensor nodes (physically separate from radar sensor nodes), or with different types of sensor mechanisms configured as components of radar sensor nodes, to collect multiple different types of activity captured within a sensor field.

A technical advantage of such status indication techniques is that specialists are not required for deployment and maintenance of radar nodes. For example, an operator does not need special tools or equipment for checking status or network status. Instead, and operator can learn or memorize different vibration cadences and determine status of a given radar node by touch. Such techniques provide direct feedback on device status without needing separate devices or radio communications back to a base. Such status indication techniques also provide quicker and quieter node deployment, thereby reducing a likelihood of discovery.

One embodiment is a radar sensor device. The radar sensor device includes a processor, a memory coupled to the processor, and power circuitry that is configured to receive a supply of power from at least one battery. The radar sensor device also includes a radar signal transmitter that is configured to transmit radar signals, and a radar signal receiver configured to receive reflected radar signals. The processor is configured to compute radar data from received reflected radar signals. Such computed radar data can include a distance from an external object, and a relative velocity of the external object, among other radar data. The radar sensor unit also includes radio circuitry that is configured to wirelessly transmit radar data to at least one peer radar sensor device that functions as a network node. The radar sensor unit includes a vibration mechanism. The radar sensor unit can execute instructions that cause the radar sensor device to power-on the radar sensor device in response to receiving an input to power-on the radar sensor device.

The radar sensor device can indicate that the radar sensor device has been successfully powered-on by causing a first vibration via the vibration mechanism. The radar sensor unit can also indicate status of a wireless network connection to a given radar sensor network by causing a second vibration using the vibration mechanism. The first and second vibration mechanisms can be different to be distinguishable types of vibration. The radar sensor device can also indicate status of the wireless network connection by causing the second predetermined pattern of vibration in response to identifying manual movement of the radar sensor device via an accelerometer. For example, the device determines, via an accelerometer, that the device has been picked-up by hand, or shaken, or otherwise handled.

The radar sensor device can indicate status of a wireless ad-hoc network that includes multiple radar sensor devices that detect movement and location of external objects. In other words, the radar sensor device can be configured to join a radar field to monitor for external objects and/or movement, and report radar data to a communication center. The radar sensor device can include the vibration mechanism lieu of circuitry or interfaces that provide a visible status indicator. For example, some deployment instructions can specify no visible or readily audible indicators can be used with the radar sensor device.

The radar sensor device can cause the first vibration using a first predetermined vibration cadence, and cause the second vibration using a second predetermined vibration cadence. This second predetermined vibration cadence can be sufficiently different from the first predetermined vibration cadence for manual differentiation. By way of a non-limiting example, the first vibration cadence can be a steady vibration for a number to seconds to indicate that the device is powered on, and then a periodic vibration (such as one vibration every one or two seconds to indicate that the device is trying to join a radar network, followed by an accelerated periodic vibration rate (such as one vibration every half second) to indicated that the device has successfully joined the radar network.

Functionality associated with the status manager will now be discussed via flowcharts and diagrams in FIG. 4 and FIG. 6. For purposes of the following discussion, the status manager or other appropriate entity performs steps in the flowcharts.

Figure 4:
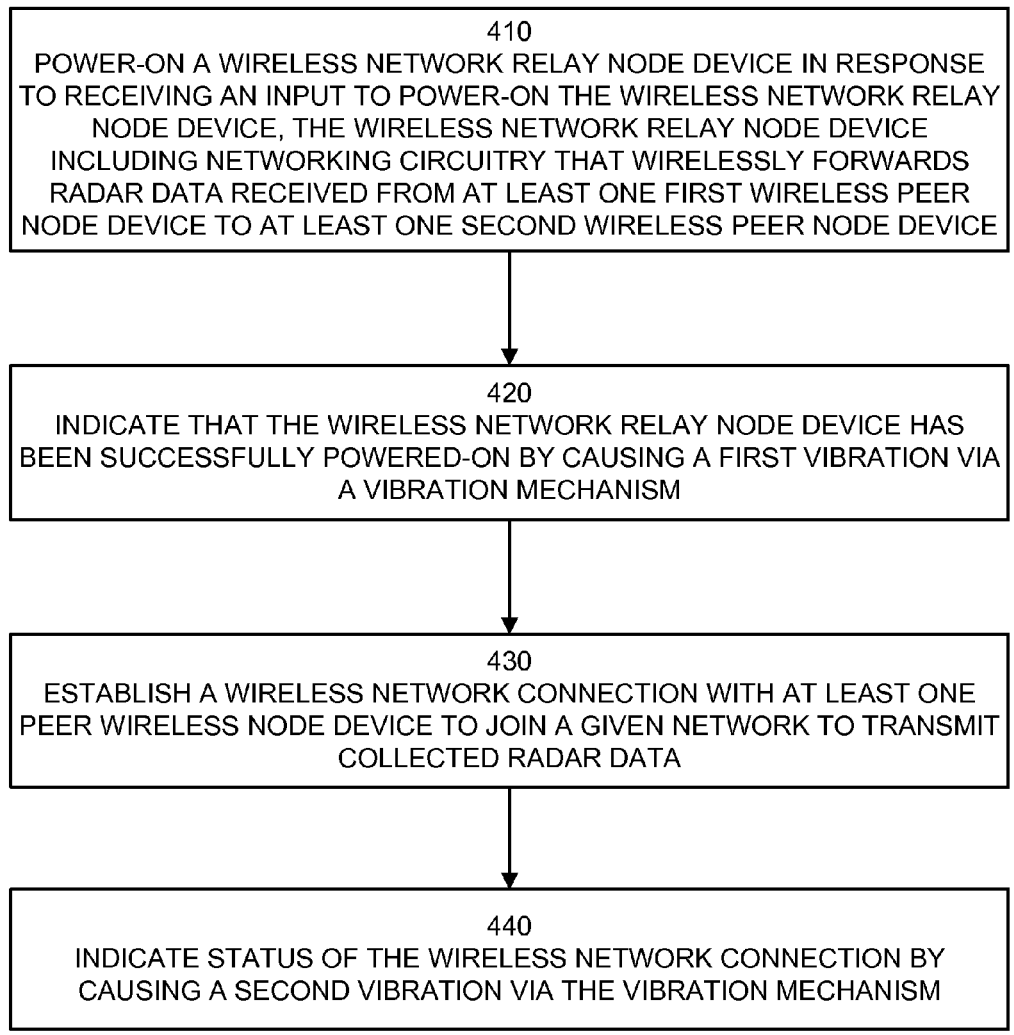
FIGS. 4-6 are flowcharts illustrating an example process supporting radar sensor status indication according to embodiments herein.

Now describing embodiments more specifically, FIG. 4 is a flow chart illustrating embodiments disclosed herein. In step 410, the status manager powers-on a wireless network relay node device in response to receiving an input to power-on the wireless network relay node device. The wireless network relay node device includes networking circuitry that wirelessly forwards radar data received from at least one first wireless peer node device to at least one second wireless peer node device. For example, the device can function as a network switch, router, or other network node.

In step 420, the status manager indicates that the wireless network relay node device has been successfully powered-on by causing a first vibration via a vibration mechanism. For example, the status manager causes a steady vibration for a predetermined period, or a quick vibration at a predetermined interval.

In step 430, the status manager establishes a wireless network connection, or initiates establishing, with at least one peer wireless node device to join a given network to transmit collected radar data.

In step 440, the status manager indicates status of the wireless network connection by causing a second vibration via the vibration mechanism. Note that depending on terrain or a particular node device, it may take time for a node to join the wireless network. Such a time period can be more than an operator may want to dwell in one location that might be dangerous. Accordingly, indicating status of the wireless network connection can also include indicating that a given radar sensor is likely to join the network, even though the given radar node has not completely joined the network. Such an embodiment can speed up the deployment. Note that a given network status vibration can mean either a probability of joining the network, or a completion of joining the network. Alternatively, there can be a vibration pattern to indicate probability of joining that is different from a vibration pattern that indicates a completion of joining the network.

Figure 5:
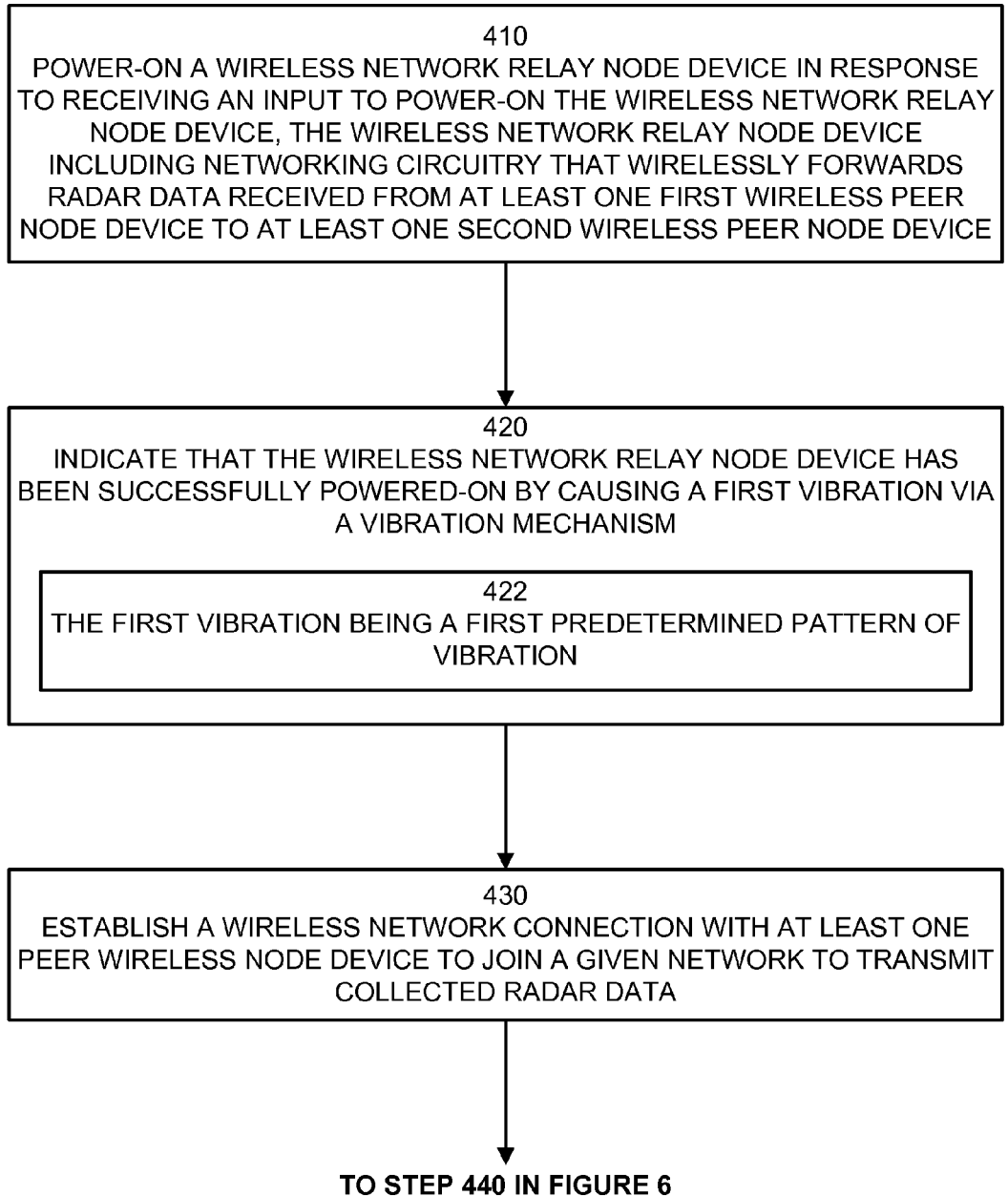
Figure 6:
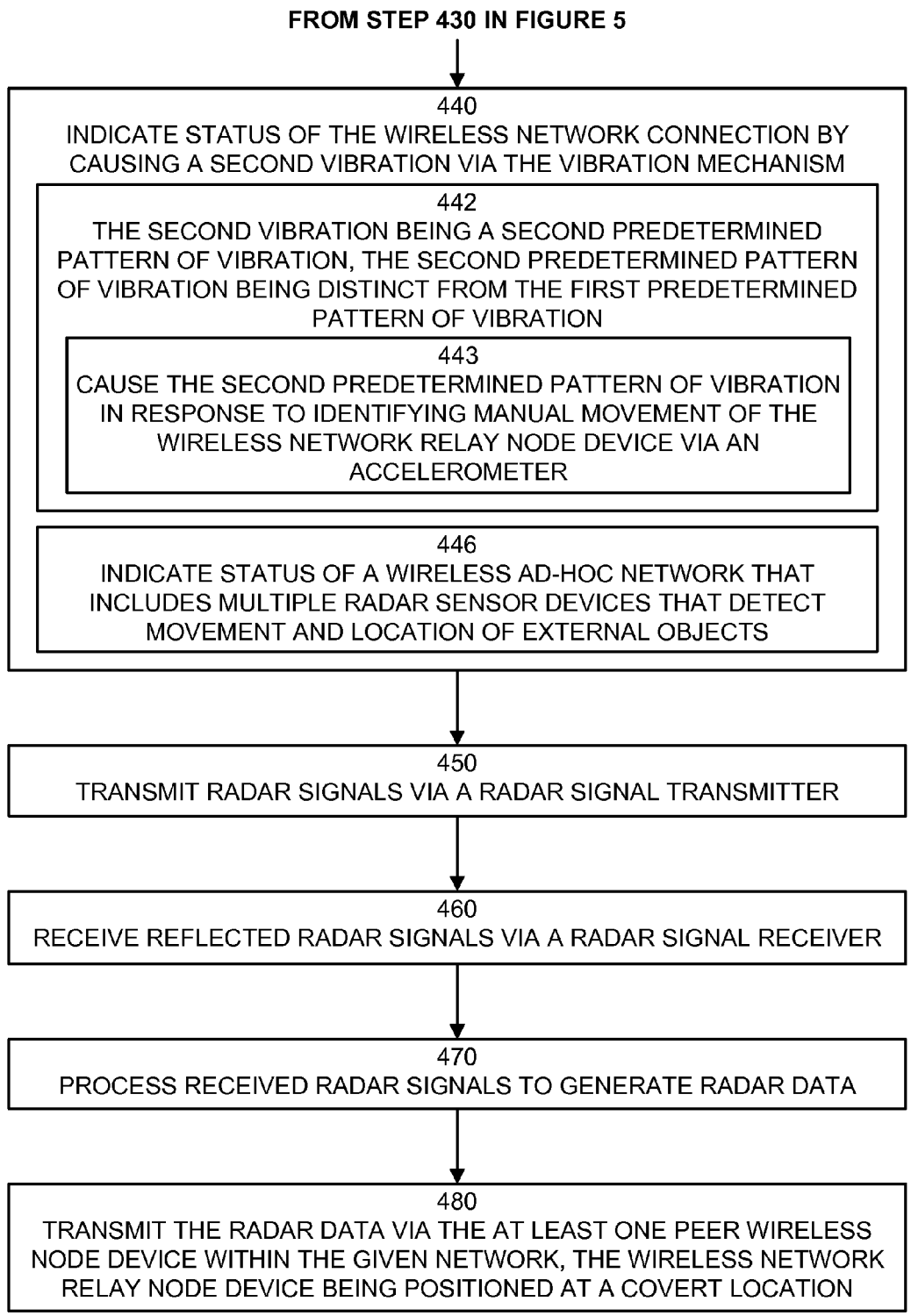

FIGS. 5 and 6 include a flow chart illustrating additional and/or alternative embodiments and optional functionality of the status manager as disclosed herein.

In step 410, the status manager powers-on a wireless network relay node device in response to receiving an input to power-on the wireless network relay node device. The wireless network relay node device includes networking circuitry that wirelessly forwards radar data received from at least one first wireless peer node device to at least one second wireless peer node device In step 420, the status manager indicates that the wireless network relay node device has been successfully powered-on by causing a first vibration via a vibration mechanism.

In step 422, the first vibration is a first predetermined pattern of vibration, for example, such as a relatively quick vibration at predetermined intervals, alternating long and short vibrations, etc.

In step 430, the status manager establishes a wireless network connection with at least one peer wireless node device to join a given network to transmit collected radar data.

In step 440, the status manager indicates status of the wireless network connection by causing a second vibration via the vibration mechanism.

In step 442, the status manager executes the second vibration as a second predetermined pattern of vibration. This second predetermined pattern of vibration is distinct from the first predetermined pattern of vibration.

In step 443, the status manager causes the second predetermined pattern of vibration in response to identifying manual movement of the wireless network relay node device via an accelerometer. For example, an operator picks up the node, turns the node, shakes the node, etc.

In step 446, the status manager indicates status of a wireless ad-hoc network that includes multiple radar sensor devices that detect movement and location of external objects.

In step 450, the node transmits radar signals via a radar signal transmitter. In step 460, the node receives reflected radar signals via a radar signal receiver. In step 470, the node processes received radar signals to generate radar data. In step 480, the node transmits the radar data via the at least one peer wireless node device within the given network. In other words, the node can optionally include radar sensor functionality. The wireless network relay node device can also be positioned at a covert or hidden location.

Another embodiment is a network node device that includes a processor, a memory coupled to the processor, power circuitry configured to receive a supply of power from at least one battery, a vibration mechanism, and radio circuitry configured to wirelessly transmit radar data to at least one peer network node device. The processor is configured to route radar data within a wireless ad hoc network, including relaying radar data from the at least one peer network node device. The memory stores instructions that, when executed by the processor, cause the radar sensor device to perform the operation of indicating status of the network node device by causing a vibration via the vibration mechanism.

Indicating status of the network node device can include indicating that the network node device has been successfully powered-on by causing a first predetermined pattern of vibration via the vibration mechanism, and indicating status of a wireless network connection to a given network by causing a second predetermined pattern of vibration via the vibration mechanism. This second predetermined pattern of vibration can be distinct from the first predetermined pattern of vibration.

This network node device can be further configured to indicate status of the wireless network connection to the given network by causing the second predetermined pattern of vibration in response to identifying manual movement of the network node device via an accelerometer. For example, an operator turns, lifts, rotates, shakes, or otherwise moves the network node device. The given network can be a wireless ad-hoc network that includes multiple network node devices that detect movement and location of external objects via radar signaling. The network node device can include the vibration mechanism in lieu of circuitry that provides a visible status indicator.

Indicating status of the network node can include indicating that the network node device has been successfully powered-on by causing a first predetermined vibration cadence via the vibration mechanism, and indicating status of a wireless network connection to a given network by causing a second predetermined vibration cadence via the vibration mechanism. The second predetermined vibration cadence can be sufficiently different from the first predetermined vibration cadence for manual differentiation. In other words, vibration cadences differ enough to be distinguishable to a typical operator handling the network node device.

Those skilled in the art will also understand that there can be many variations made to the operations of the techniques explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

The invention claimed is:

1. A radar sensor device comprising:
   a processor;
   a memory coupled to the processor;
   power circuitry configured to receive a supply of power from at least one battery;
   a radar signal transmitter configured to transmit radar signals;
   a radar signal receiver configured to receive reflected radar signals;
   the processor configured to compute radar data from received reflected radar signals, computed radar data including a distance from an external object, and a relative velocity of the external object;
   radio circuitry configured to wirelessly transmit radar data to at least one peer radar sensor device functioning as a network node;
   a vibration mechanism; and
   the memory storing instructions that, when executed by the processor, cause the radar sensor device to perform the operations of:
   powering-on the radar sensor device in response to receiving an input to power-on the radar sensor device;

indicating that the radar sensor device has been successfully powered-on by causing a first vibration via the vibration mechanism; and indicating status of a wireless network connection to a given radar sensor network by causing a second vibration via the vibration mechanism.

2. The radar sensor device of claim 1, further comprising:
wherein causing the first vibration via the vibration mechanism includes the first vibration being a first predetermined pattern of vibration; and
wherein causing the second vibration via the vibration mechanism includes the second vibration being a second predetermined pattern of vibration, the second predetermined pattern of vibration being distinct from the first predetermined pattern of vibration.

3. The radar sensor device of claim 2, wherein indicating status of the wireless network connection to the given radar sensor network includes causing the second predetermined pattern of vibration in response to identifying manual movement of the radar sensor device via an accelerometer.

4. The radar sensor device of claim 3, wherein identifying manual movement of the radar sensor device via the accelerometer includes identifying the manual movement as the radar sensor device having been shaken.

5. The radar sensor device of claim 1, wherein indicating status of the wireless network connection includes indicating status of a wireless ad-hoc network that includes multiple radar sensor devices that detect movement and location of external objects.

6. The radar sensor device of claim 1, wherein the vibration mechanism is coupled to the radar sensor device in lieu of circuitry that provides a visible status indicator.

7. The radar sensor device of claim 1, further comprising:
wherein causing the first vibration via the vibration mechanism includes the first vibration being a first predetermined vibration cadence; and
wherein causing the second vibration via the vibration mechanism includes the second vibration being a second predetermined vibration cadence, the second predetermined vibration cadence being sufficiently different from the first predetermined vibration cadence for manual differentiation.

8. A method comprising:
powering-on a wireless network relay node device in response to receiving an input to power-on the wireless network relay node device, the wireless network relay node device including networking circuitry that wirelessly forwards radar data received from at least one first wireless peer node device to at least one second wireless peer node device;
indicating that the wireless network relay node device has been successfully powered-on by causing a first vibration via a vibration mechanism;
establishing a wireless network connection with at least one peer wireless node device to join a given network to transmit collected radar data; and
indicating status of the wireless network connection by causing a second vibration via the vibration mechanism.

9. The method of claim 8, further comprising:
wherein causing the first vibration via the vibration mechanism includes the first vibration being a first predetermined pattern of vibration; and
wherein causing the second vibration via the vibration mechanism includes the second vibration being a second predetermined pattern of vibration, the second predetermined pattern of vibration being distinct from the first predetermined pattern of vibration.

10. The method of claim 9, wherein indicating status of the wireless network connection includes causing the second predetermined pattern of vibration in response to identifying manual movement of the wireless network relay node device via an accelerometer.

11. The method of claim 10, wherein identifying manual movement of the wireless network relay node device via the accelerometer includes identifying the manual movement as the wireless network relay node device having been shaken.

12. The method of claim 8, wherein indicating status of the wireless network connection includes indicating status of a wireless ad-hoc network that includes multiple radar sensor devices that detect movement and location of external objects.

13. The method of claim 8, further comprising:
wherein causing the first vibration via the vibration mechanism includes the first vibration being a first predetermined vibration cadence;
wherein causing the second vibration via the vibration mechanism includes the second vibration being a second predetermined vibration cadence, the second predetermined vibration cadence being sufficiently different from the first predetermined vibration cadence for manual differentiation;
transmitting radar signals via a radar signal transmitter;
receiving reflected radar signals via a radar signal receiver;
processing received radar signals to generate radar data; and
transmitting the radar data via the at least one peer wireless node device within the given network, the wireless network relay node device being positioned at a covert location.

14. A network node device comprising:
a processor;
a memory coupled to the processor;
power circuitry configured to receive a supply of power from at least one battery;
radio circuitry configured to wirelessly transmit radar data to at least one peer network node device;
the processor configured to route radar data within a wireless ad hoc network, including relaying radar data from the at least one peer network node device;
a vibration mechanism; and
the memory storing instructions that, when executed by the processor, cause the network node device to perform the operation of:
indicating status of the network node device by causing a vibration via the vibration mechanism.

15. The network node device of claim 14, further comprising:
wherein indicating status of the network node device includes:
indicating that the network node device has been successfully powered-on by causing a first predetermined pattern of vibration via the vibration mechanism; and
indicating status of a wireless network connection to a given network by causing a second predetermined pattern of vibration via the vibration mechanism; the second predetermined pattern of vibration being distinct from the first predetermined pattern of vibration.

16. The network node device of claim 15, wherein indicating status of the wireless network connection to the given network includes causing the second predetermined pattern of vibration in response to identifying manual movement of the network node device via an accelerometer.

17. The network node device of claim 16, wherein identifying manual movement of the network node device via the accelerometer includes identifying the manual movement as the network node device having been shaken.

18. The network node device of claim 14, wherein indicating status of the network node device includes indicating status of a connection to a wireless ad-hoc network that includes multiple network node devices that detect movement and location of external objects via radar signaling.

19. The network node device of claim 14, wherein the vibration mechanism is coupled to the network node device in lieu of circuitry that provides a visible status indicator.

20. The network node device of claim 14, further comprising:
    wherein indicating status of the network node device includes:
        indicating that the network node device has been successfully powered-on by causing a first predetermined vibration cadence via the vibration mechanism; and
        indicating status of a wireless network connection to a given network by causing a second predetermined vibration cadence via the vibration mechanism, the second predetermined vibration cadence being sufficiently different from the first predetermined vibration cadence for manual differentiation.

\* \* \* \* \*